US012683293B2

(12) United States Patent
Jervis et al.

(10) Patent No.: US 12,683,293 B2
(45) Date of Patent: Jul. 14, 2026

(54) ACCESS POINTS THAT GENERATE ANTENNA BEAMS HAVING OPTIMIZED RADIATION PATTERNS AND POLARIZATIONS AND RELATED METHODS

(71) Applicant: RUCKUS IP HOLDINGS LLC, Claremont, NC (US)

(72) Inventors: James W. Jervis, Santa Clara, CA (US); Anand Krishnamachari, Campbell, CA (US)

(73) Assignee: Ruckus IP Holdings LLC, Horsham, PA (US)

( * ) Notice: Subject to any disclaimer, the term of this patent is extended or adjusted under 35 U.S.C. 154(b) by 107 days.

(21) Appl. No.: 18/840,422

(22) PCT Filed: Feb. 16, 2023

(86) PCT No.: PCT/US2023/013199

§ 371 (c)(1),
(2) Date: Aug. 21, 2024

(87) PCT Pub. No.: WO2023/167785

PCT Pub. Date: Sep. 7, 2023

(65) Prior Publication Data

US 2025/0192448 A1 Jun. 12, 2025

Related U.S. Application Data

(60) Provisional application No. 63/315,645, filed on Mar. 2, 2022.

(51) Int. Cl.
*H01Q 21/26* (2006.01)
*H01Q 19/10* (2006.01)

(52) U.S. Cl.
CPC .......... *H01Q 21/26* (2013.01); *H01Q 19/108* (2013.01)

(58) Field of Classification Search
CPC .... H01Q 1/007; H01Q 1/2291; H01Q 19/108; H01Q 21/205; H01Q 21/26
See application file for complete search history.

(56) References Cited

U.S. PATENT DOCUMENTS 9,618,606 B2 * 4/2017 Hellsten .................... G01S 7/03
2009/0207092 A1 8/2009 Nysen et al.
2012/0122414 A1 5/2012 Noguchi et al.
2014/0313093 A1 10/2014 Smith et al.
2015/0070243 A1 3/2015 Kish et al.
(Continued)

FOREIGN PATENT DOCUMENTS

WO 2021118817 A1 6/2021

OTHER PUBLICATIONS

"International Search Report and Written Opinion of the International Searching Authority", International Application No. PCT/US2023/013199, Jun. 14, 2023, 16 pp.

*Primary Examiner* — Hoang V Nguyen
(74) *Attorney, Agent, or Firm* — Myers Bigel, P.A.

(57) ABSTRACT

Access points include a ground plane, an antenna that includes at least a first radiating element, the first radiating element including a first dipole arm and a second dipole arm that are mounted above the ground plane, and a feed network that is connected to the antenna. The feed network is selectively configurable to feed the first and second dipole arms either in-phase or out-of-phase.

18 Claims, 7 Drawing Sheets

(56) References Cited

U.S. PATENT DOCUMENTS

| | | | |
|---|---|---|---|
| 2016/0294063 | A1 | 10/2016 | Mcgough et al. |
| 2017/0078013 | A1* | 3/2017 | Sanderovich ............ H04B 7/10 |
| 2021/0226329 | A1 | 7/2021 | Krishnamachari et al. |
| 2021/0265746 | A1 | 8/2021 | Kough et al. |
| 2021/0351520 | A1 | 11/2021 | Obeidat et al. |

* cited by examiner

ACCESS POINTS THAT GENERATE ANTENNA BEAMS HAVING OPTIMIZED RADIATION PATTERNS AND POLARIZATIONS AND RELATED METHODS

CROSS-REFERENCE TO RELATED APPLICATIONS

The present application is a 35 U.S.C. § 371 national stage application of PCT Application No. PCT/US2023/013199, filed on Feb. 16, 2023, which itself claims priority to U.S. Provisional Patent Application Ser. No. 63/315,645, filed Mar. 2, 2022, the entire contents of both of which are incorporated herein by reference.

BACKGROUND

The present invention generally relates to radio communications and, more particularly, to access points for wireless local area network and to methods of operating such access points A wireless local area network ("WLAN") refers to a network that operates in a limited area (e.g., within a home, school, store, campus, shopping mall, etc.) that interconnects two or more electronic devices using wireless radio frequency ("RF") communications. Electronic devices belonging to users ("clients") of a WLAN, such as smartphones, computers, tablets, printers, appliances, televisions, lab equipment and the like ("client devices"), can communicate with each other and with external networks such as the Internet over the WLAN. The client devices may be moved throughout the area covered by the WLAN and remain connected to the network. Most WLANs operate under a family of standards promulgated by the Institute of Electrical and Electronics Engineers (IEEE) that are referred to as the IEEE 802.11 standards. WLANs operating under the IEEE 802.11 family of standards are commonly referred to as WiFi networks. Client devices that have a networking subsystem that includes a WiFi network interface can communicate over WiFi networks.

A WiFi network includes one or more access points that are typically installed at fixed locations. The WiFi network can include a single access point that provides coverage in a very limited area or may include tens, hundreds or thousands of access points that provide in-building and/or outdoor coverage to a large campus or region. The access points may be connected to each other and/or to one or more controllers through wired and/or wireless connections. Client devices communicate with each other and/or with wired devices that are connected to the WiFi network through the access points. The WiFi network typically includes one or more gateways that may be used to provide Internet access to the client devices.

RF signals that are transmitted from an access point to a client device, or vice versa, may be degraded when they reach the receiving device for a variety of reasons. For example, during transmission wireless channels may experience fading, which refers to an attenuation of the RF signal beyond the attenuation that results from free space loss. Atmospheric conditions (e.g., rainfall, lightning, etc.) and obstacles (e.g., intervening structures such as buildings, vegetation, hills and the like) can cause fading that results in the strength (magnitude) of the RF signal to be reduced at the receive electronic device. WiFi signals may also reflect off of obstacles, and thus both a direct signal and multiple reflected signals may arrive at the receive device. If these signals arrive at the receive electronic device with different phases, as is typically the case, then the signals may destructively combine at the receive electronic device, further reducing the received signal strength. The reduction in received signal strength typically decreases the throughput supported by the WiFi network.

Two known techniques for increasing throughput in a WiFi network are the use of directional antenna patterns and the use of switched polarization diversity. Most access points include omnidirectional antennas that are mounted to extend forwardly from a ground plane. These antennas generate antenna beams that have a relatively constant gain in almost all directions extending forwardly of the ground plane to provide coverage throughout a hemisphere. The use of such antennas allows the access point to provide good coverage in all directions except rearwardly of the access point. However, since the antenna beams extend through a full hemisphere, the gain in any given direction is somewhat limited. To provide increased antenna gain, some access points have antenna beams that can be shaped using, for example, parasitic pattern shaping elements such as directors or reflectors or by using a phased array antenna that includes a plurality of radiating elements that can generate shaped antenna beams by phasing the sub-components of the RF signals that are fed to the individual radiating elements in the array. These shaped antenna beams exhibit higher gain in some directions and lower gain in other directions. Such an access point may be programmed, for example, to use shaped antenna beams that have higher gain in the direction of a particular user when transmitting to that user. These access points may use omnidirectional antenna patterns when receiving RF signals from client devices, as the access point typically will not know in advance which client device will transmit a signal to the access point at any given moment in time. By transmitting RF signals to client devices using higher gain antenna patterns, the overall throughput can typically be increased.

Polarization diversity is another technique that can be used to increase throughput. The "polarization" of an RF signal propagating through space refers to the orientation of the electric field of the RF signal. Antennas are designed to transmit and receive RF signals having certain electric field orientations. For example, an RF signal emitted by a single dipole radiating element will have a linear polarization. The orientation of this linear polarization with respect to a reference plane (e.g., the horizon, a ground plane, etc.) may be set by the manner in which the dipole radiating elements are oriented relative to the reference plane and by how the RF signal that is fed to the dipole arms of the dipole radiating element is phased. Generally speaking, communication performance is maximized if the RF signals incident on a receiving radiating element have the same polarization as the receiving radiating element. Thus, in a direct line-of-sight communications system with an ideal (non-fading) channel, system performance can be optimized by having the transmitting and receiving radiating elements have the same polarization. The polarization of a transmitted RF signal, however, may change when the RF signal reflects off of objects (e.g., walls, the ground, raindrops, etc.), and thus while an RF signal may be transmitted at a first polarization, there is no guarantee that the RF signal will have the first polarization when it reaches a receive device. If the polarization of the RF signal at the receiver is significantly different from the polarization of the antenna the receiving device, then substantial fading can occur (e.g., 10-20 dB).

Polarization diversity, in its simplest implementation, involves transmitting RF signals to a receiving electronic device through first and second radiating elements that have orthogonal polarizations and determining which transmission provides the best performance as measured by some performance metric such as received signal strength, throughput, or the like. The transmitting electronic device then "selects" the radiating element having the polarization that provided the best performance, and uses this radiating element for subsequent transmissions to the receiving electronic device. The transmitting electronic device periodically transmits RF signals through the non-selected one of the first and second radiating elements to confirm that the radiating element that provides the best performance has not changed (e.g., due to movement of the transmitting or receiving electronic device or due to changes in the channel conditions). A wide variety of different algorithms may be used to determine when and/or how often the transmitting electronic device periodically transmits RF signals through the non-selected one of the first and second radiating elements (e.g., after a predefined interval, when the performance metric of transmissions using the selected radiating element falls below a threshold, etc.). More complex polarization diversity schemes may also be used, including schemes which can transmit RF signals at any arbitrary polarization.

U.S. Patent Publication No. 2021/0265746, filed Feb. 18, 2021, discloses access points that implement polarization diversity by appropriately phasing first and second subcomponents of an RF signal that are transmitted through first and second radiating elements that have respective horizontal and vertical polarizations. This allows for the access point to generate a wireless signal having any arbitrary polarization. Thus, the polarization of the antenna system at the access point may be set so that the polarization of the RF signal received at the client devices will match the polarizations of the receive antennas at the client devices. U.S. Patent Publication No. 2021/0351520, filed Apr. 29, 2021, discloses access points having antenna systems that include multiple radiating elements. These radiating elements may be fed to generate wireless signals having any arbitrary polarization. Moreover, some of the radiating elements as well as passive directors may be selectively coupled to ground to modify the radiation pattern generated by the antenna system.

SUMMARY

Pursuant to some embodiments of the present invention, access points suitable for use in WiFi networks are provided that include a ground plane; an antenna that includes at least a first radiating element, the first radiating element including a first pair of dipole arms that are mounted above the ground plane; and a feed network that is connected to the antenna. The feed network is selectively configurable to feed the first pair of dipole arms either in-phase or out-of-phase. Herein, two dipole arms in the pair are fed in-phase if the RF signals fed to each dipole arm have substantially the same phase, and two dipole arms are fed out-of-phase if the RF signals fed to each dipole arm are out-of-phase by substantially 180°.

In some embodiments, the first radiating element may be configured to radiate RF energy having a horizontal polarization with respect to the ground plane when the first pair of dipole arms are fed out-of-phase and to radiate RF energy having a vertical polarization with respect to the ground plane when the first pair of dipole arms are fed in-phase.

In some embodiments, the antenna may be configurable such that it can selectively generate one of a plurality of different radiation patterns, and the access point may be configured to select, for each of a plurality of client devices, a combination of a polarization for the first radiating element and a radiation pattern for the antenna that are used for transmission of RF signals from the access point to each of the client devices.

In some embodiments, the antenna may further include a first and second parasitic pattern shaping elements that are each configured to be selectively shape a radiation pattern of the first radiating element, where the first parasitic pattern shaping element extends substantially parallel to the ground plane and the second parasitic pattern shaping element extends substantially perpendicular to the ground plane. The first and second parasitic pattern shaping elements may each be configured to be selectively coupled to the ground plane.

In some embodiments, the first parasitic pattern shaping element may be a first reflector that is mounted radially outwardly of the first radiating element and has a longitudinal axis that extends in parallel with the ground plane, and the second parasitic pattern shaping element may be a second reflector that is mounted radially outwardly of the first radiating element and has a longitudinal axis that extends perpendicular to the ground plane.

In some embodiments, the antenna may further comprise at least a second dipole radiating element and a third dipole radiating element that together with the first dipole radiating element form at least part of an Alford Loop. The second dipole radiating element includes a second pair of dipole arms and the third dipole radiating element includes a third pair of dipole arms. The feed network may be selectively configurable to feed all of the first through third pairs of dipole arms either in-phase or out-of-phase.

The first pair of dipole arms may comprise a first dipole arm and a second dipole arm. In some embodiments, the feed network may include a first switch having an input, a first output that is electrically connected to the second dipole arm, and a second output that is electrically connected to the ground plane and a first RF transmission line that includes a signal conductor that is electrically connected to the first dipole arm and a ground conductor that is electrically connected to an input of the first switch. The feed network may further include a second switch that is configured to selectively electrically connect the first output of the first switch to the first dipole arm.

Pursuant to further embodiments of the present invention, access points suitable for use in WiFi networks are provided that include a ground plane; an antenna that includes at least a first radiating element, the first radiating element including a first pair of dipole arms that are mounted above the ground plane; and a feed network that is connected to the antenna. The first radiating element is selectively configurable to transmit and receive RF signals having a horizontal polarization with respect to the ground plane or a vertical polarization with respect to the ground plane.

In some embodiments, the antenna may be configurable to selectively generate one of a plurality of different radiation patterns, and the access point may be configured to select, for each of a plurality of client devices, a combination of a polarization for the first radiating element and a radiation pattern for the antenna that are used for transmission of RF signals from the access point to each of the client devices.

In some embodiments, the antenna may further include at least second and third dipole radiating elements that together with the first dipole radiating element form at least part of an Alford Loop. In such embodiments, the second radiating element includes a second pair of dipole arms and the third radiating element includes a third pair of dipole arms. In such embodiments, the feed network may be selectively configurable to feed all three of the first through third pairs of dipole arms either in-phase or out-of-phase. The access point may also include first through third pairs of parasitic pattern shaping elements that are mounted radially outwardly of the respective first through third dipole radiating elements, each pair of parasitic pattern shaping elements including a first parasitic pattern shaping element that is configured to shape radiation patterns emitted by the first radiating element that have a horizontal polarization with respect to the ground plane and a second parasitic pattern shaping element that is configured to shape radiation patterns emitted by the first radiating element that have a vertical polarization with respect to the ground plane. In some embodiments, each first parasitic pattern shaping element comprises a first reflector that has a longitudinal axis that extends substantially parallel with the ground plane, and each second parasitic pattern shaping element comprises a second reflector that has a longitudinal axis that extends substantially perpendicular to the ground plane.

The first pair of dipole arms may comprise a first dipole arm and a second dipole arm. In some embodiments, the feed network may include a first switch having an input, a first output that is electrically connected to the second dipole arm, and a second output that is electrically connected to the ground plane and a first RF transmission line that includes a signal conductor that is electrically connected to the first dipole arm and a ground conductor that is electrically connected to an input of the first switch. The feed network may also include a second switch that is configured to selectively electrically connect the first output of the first switch to the first dipole arm.

Pursuant to additional embodiments of the present invention access points are provided that include a dipole radiating element that includes a first dipole arm and a second dipole arm, a ground plane, a first switch having an input, a first output that is electrically connected to the second dipole arm, and a second output that is electrically connected to the ground plane, a first feed transmission line that includes a signal conductor that is electrically connected to the first dipole arm and a ground conductor that is electrically connected to an input of the first switch, and a second switch that is configured to selectively electrically connect the first output of the first switch to the first dipole arm.

In some embodiments, the first switch may be a single pole double throw switch and/or the second switch may be a single pole single throw switch (e.g., a PIN diode).

In some embodiments, the access point may further include a plurality of additional dipole radiating elements, the dipole radiating element and the plurality of additional dipole radiating elements configured as an Alford Loop, each of the plurality of additional dipole radiating elements comprising a first dipole arm and a second dipole arm. In such embodiments, the feed network may further include a power divider having an input that is coupled to the signal conductor and a plurality of outputs that electrically connect the signal conductor to the respective first dipole arms of the dipole radiating element and the plurality of additional dipole radiating elements in the Alford Loop. In such embodiments, the access point may further include a plurality of additional first switches, each additional first switch having an input that is electrically connected to the ground conductor, a first output that is electrically connected to the second dipole arm of a respective one of the plurality of additional dipole radiating elements, and a second output that is electrically connected to the ground plane and may also include a plurality of additional second switches that are configured to selectively electrically connect the first output of a respective one of the plurality of additional first switches to the first dipole arm of a respective one of the plurality of additional dipole radiating elements.

In some embodiments, the access point may further include a first parasitic pattern shaping element that is configured to shape first radiation patterns emitted by the dipole radiating element that have a horizontal polarization with respect to the ground plane and a second parasitic pattern shaping element that is configured to shape second radiation patterns emitted by the dipole radiating element that have a vertical polarization with respect to the ground plane.

In some embodiments, the first parasitic pattern shaping element may be a first reflector that has a longitudinal axis that extends in parallel with the ground plane, and the second parasitic pattern shaping element may be a second reflector that has a longitudinal axis that extends perpendicular to the ground plane.

In some embodiments, the access point may be configured to set the first and second switches so that the dipole radiating element will emit RF energy having a first polarization when transmitting to a first client device and to set the first and second switches so that the dipole radiating element will emit RF energy having a different second polarization when transmitting to a second client device.

Pursuant to still further embodiments of the present invention, methods of operating an access point that includes a first radiating element are provided. Pursuant to these methods, respective polarizations for the first radiating element are selected that will be used for RF transmissions from the access point to a plurality of client devices. Respective radiation patterns for the first radiating element are also selected that will be used for the RF transmissions from the access point to the plurality of client devices. Thereafter, RF signals are transmitted to the plurality of client devices using the respective selected polarizations and radiation patterns for the first radiating element.

In some embodiments, selecting the respective polarizations for the first radiating element comprises selecting one of a horizontal polarization and a vertical polarization for the first radiating element that will be used for RF transmissions from the access point to the respective client devices.

In some embodiments, the horizontal polarization is implemented by feeding first and second dipole arms of the first radiating element in-phase, and the vertical polarization is implemented by feeding the first and second dipole arms of the first radiating element out-of-phase.

In some embodiments, selecting respective radiation patterns for the first radiating element comprises selecting selected ones of a plurality of parasitic pattern shaping elements that will be coupled to the ground plane during RF transmissions from the access point to respective ones of the plurality of client devices.

In some embodiments, each polarization for the first radiating element is selected before the corresponding radiation pattern for the first radiating element is selected.

In some embodiments, each combination of the polarization for the first radiating element and the radiation pattern for the first radiating element are selected at the same time.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 1:
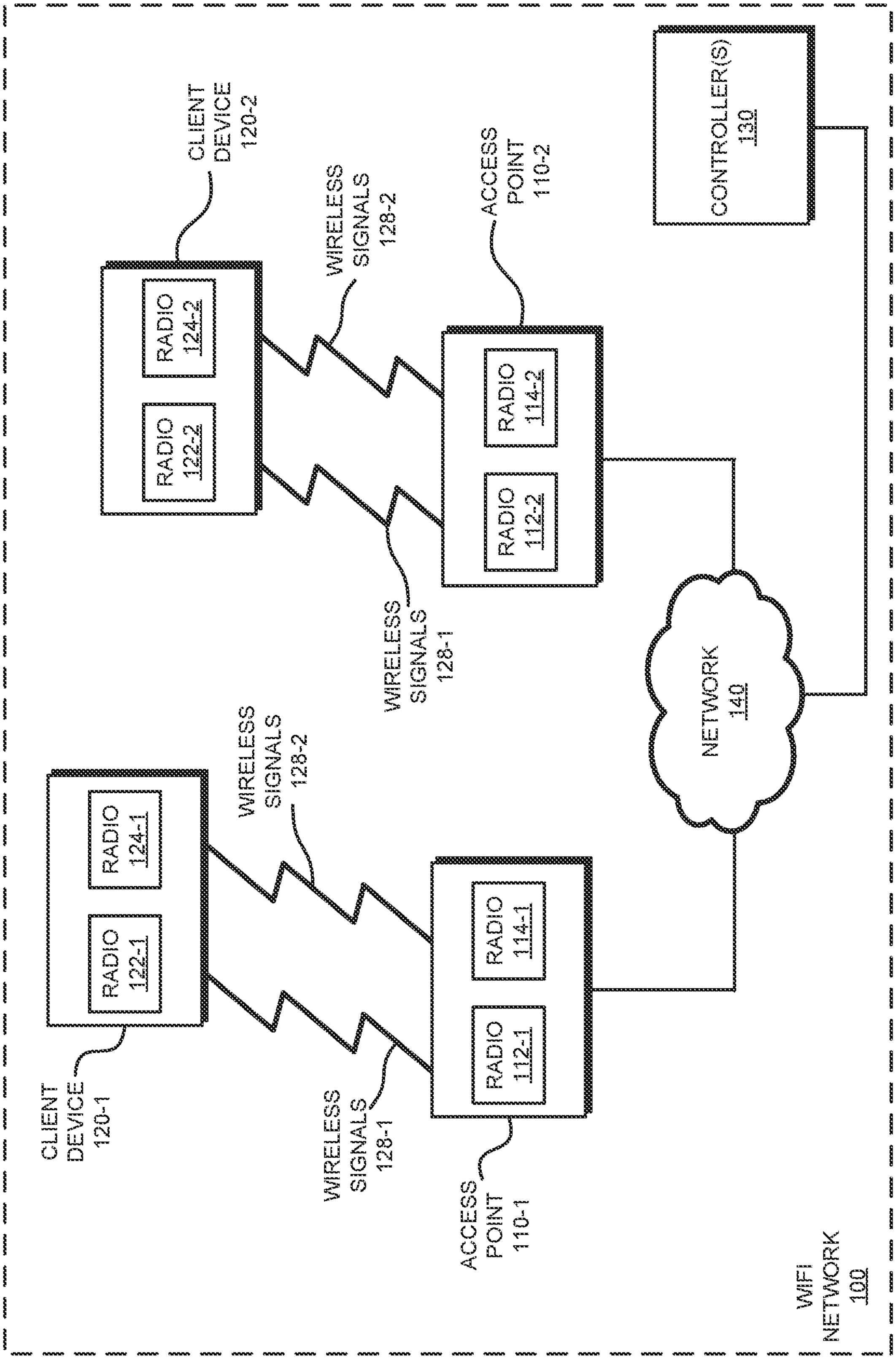
FIG. 1 is a block diagram of a simplified WiFi network.

Pursuant to embodiments of the present invention, access points are provided that implement polarization diversity and selectively use directional antenna patterns to provide improved performance. These access points may use antennas having one or more dipole radiating elements that can be selectively set to transmit and receive RF signals with either a horizontal polarization or a vertical polarization. This may be accomplished by feeding the two dipole arms of each dipole radiating element either out-of-phase or in-phase. For each client device associated with the access point, the polarization of each antenna that will maximize a performance criteria for communications between the antenna and the respective client device may be periodically identified. Each antenna may be set to transmit RF signals at the respective identified polarizations when the antenna is used to transmit RF signals to each particular client device. In addition, the access points according to embodiments of the present invention may also have adjustable radiation patterns. Radiation patterns that are determined as maximizing a performance criteria are selected for the transmissions from each antenna of the access point to each associated client device. The "optimum" polarization and radiation pattern for each antenna, for each client device, may be selected independently of each other or may be selected together using an algorithm that compares the performance of different combinations of polarizations and radiation patterns. In this fashion, the overall throughput of a WiFi network that includes the access point may be increased.

By configuring the radiating elements so that they can transmit and receive signals at either of two polarizations, polarization diversity may be achieved without expanding the number of radiating elements required for the access point. Moreover, since one of two orthogonal polarizations will typically provide improved performance over the other polarization, the overall throughput supported by the access point can be increased.

The access points according to embodiments of the present invention may include feed networks that may selectively feed the dipole arms of each dipole radiating element either in-phase or out-of-phase. The access points may also include associated parasitic pattern shaping elements such as directors or reflectors that are positioned adjacent the radiating elements and that can be selectively coupled to ground so that they either do, or do not, alter the radiation patterns generated by the radiating elements. These parasitic pattern shaping elements are used to focus the radiation pattern in desired directions to provide increased gain in those directions.

Pursuant to some specific embodiments of the present invention, access points suitable for use in WiFi networks are provided that include a ground plane; an antenna that includes at least a first radiating element, the first radiating element including a first pair of dipole arms; and a feed network that is connected to the antenna. The feed network may be selectively configurable to feed the first pair of dipole arms either in-phase or out-of-phase and/or the first radiating element may be selectively configurable to transmit and receive RF signals having a horizontal polarization with respect to the ground plane or a vertical polarization with respect to the ground plane.

In some embodiments, the antenna may be configurable such that it can selectively generate one of a plurality of different radiation patterns, and the access point may be configured to select, for each of a plurality of client devices, a combination of a polarization and a radiation pattern for the antenna that are used for transmission of RF signals from the access point to each of the client devices. In some embodiments, the access point may further include first and second parasitic pattern shaping elements that are mounted adjacent the first radiating element, where the first parasitic pattern shaping element extends substantially parallel to the ground plane and the second parasitic pattern shaping element extends substantially perpendicular to the ground plane. The first and second parasitic pattern shaping elements may each be configured to be selectively coupled to the ground plane and positioned to shape a radiation pattern of the first radiating element when electrically connected to the ground plane. In some embodiments, the first parasitic pattern shaping element may be a first reflector that is mounted radially outwardly of the first radiating element and has a longitudinal axis that extends substantially in parallel with the ground plane, and the second parasitic pattern shaping element may be a second reflector that is mounted radially outwardly of the first radiating element and has a longitudinal axis that extends substantially perpendicular to the ground plane.

In any of the above embodiments, the antenna may further comprise at least a second dipole radiating element and a third dipole radiating element that together with the first dipole radiating element form at least part of an Alford Loop. The first through third dipole radiating elements may include respective first through third pairs of dipole arms that are mounted above the ground plane, and the feed network may be selectively configurable to feed the first through third pairs of dipole arms either in-phase or out-of-phase.

The first pair of dipole arms may comprise a first dipole arm and a second dipole arm. In some embodiments, the feed network may include a first switch having an input, a first output that is electrically connected to the second dipole arm, and a second output that is electrically connected to the ground plane and a first RF transmission line that includes a signal conductor that is electrically connected to the first dipole arm and a ground conductor that is electrically connected to an input of the first switch. The feed network may further include a second switch that is configured to selectively electrically connect the first output of the first switch to the first dipole arm.

Pursuant to additional embodiments of the present invention, access points are provided that include a dipole radiating element that includes a first dipole arm and a second dipole arm, a ground plane, a first switch having an input, a first output that is electrically connected to the second dipole arm, and a second output that is electrically connected to the ground plane, a first RF transmission line that includes a signal conductor that is electrically connected to the first dipole arm and a ground conductor that is electrically connected to an input of the first switch, and a second switch that is configured to selectively electrically connect the first output of the first switch to the first dipole arm.

In other embodiments of the present invention, methods of operating an access point that includes a first radiating element are provided. Pursuant to these methods, respective polarizations for the first radiating element are selected that will be used for RF transmissions from the access point to a plurality of client devices that are associated with the access point. Respective radiation patterns for the first radiating element are also selected that will be used for the RF transmissions from the access point to the plurality of client devices. Thereafter, RF signals are transmitted to the plurality of client devices using the respective selected polarizations and radiation patterns for the first radiating element.

Before describing example embodiments of the present invention in detail, it is helpful to describe various of the elements included in a WiFi network.

FIG. 1 is a block diagram illustrating a simplified WiFi network 100 in which the access points according to embodiments of the present invention may be used. As shown in FIG. 1, the WiFi network 100 includes one or more access points 110, one or more client devices 120, and one or more optional controllers 130. The access points 110 may communicate with one or more of the client devices 120 using wireless communication that is compatible with an IEEE 802.11 standard. At least some of the access points 110 may include multiple radios so that the access points support operation in, for example, two or three different frequency bands. In the depicted embodiment, each access point is illustrated as being a dual-band access point that includes a first access point radio 112 that operates in a first frequency band (e.g., the 2.401-2.484 GHz or "2.4 GHz" frequency band) and a second access point radio 114 that operates in a second frequency band (e.g., the 5.170-5.835 GHz or "5 GHz" frequency band). The client devices 120 may also include one or more client radios 122, 124 that operate in respective frequency bands (e.g., the 2.4 GHz frequency band and the 5 GHz frequency band). It will be appreciated that some or all of the access points and/or client devices may be configured to operate in more or less than two different frequency bands.

The access points 110 may also communicate with the one or more optional controllers 130 via a network 140, which may comprise, for example, the Internet, an intra-net and/or one or more dedicated communication links. It will also be appreciated that some access points 110 may only be connected to the network 140 through other access points 110 (e.g., in a mesh network implementation). Note that the optional controllers 130 may be at the same location as the other components in WiFi network 100 or may be located remotely (e.g., cloud based controllers 130). The access points 110 may be managed and/or configured by the controllers 130. The access points 110 may communicate with the controller(s) 130 or other services using wireless communications and/or using a wired communication protocol, such as a wired communication protocol that is compatible with an IEEE 802.3 standard. The access points 110 may provide the client devices 120 access to the network 140. The access points 110 may be physical access points or may be virtual access points that are implemented on a computer or other electronic device. While not shown in FIG. 1, the WiFi network 100 may include additional components or electronic devices, such as, for example, a router.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 10, the access points 110, client devices 120 and/or the controllers 130 may include subsystems, such as a networking subsystem, a memory subsystem and a processor subsystem. The networking subsystems of the access points 110 may include the above-described access point radios 112, 114, and the networking subsystems of the client devices 120 may include the above-described client radios 122, 124.

As can be seen in FIG. 1, wireless RF signals 128-1 (represented by a jagged line) are transmitted from the first radio 122-1 in client device 120-1. These wireless signals 128-1 are received by the first radio 112-1 in at least one of the access points 110, such as access point 110-1. Likewise, wireless signals 128-2 are transmitted from the second radio 124-1 in client device 120-1, and may be received by the second radio 114-1 of access point 110-1. The wireless signals 128-1, 128-2 may comprise frames or packets. It will be appreciated that wireless signals 128-1, 128-2 may flow in both directions, namely from a client device 120 to an access point 110, and from an access point 110 to a client device 120.

The communication between client device 120-1 and access point 110-1 may be characterized by a variety of performance metrics, including, for example, a data rate, throughput (i.e., the data rate for successful transmissions), an error rate (such as a retry or resend rate), a signal-to-noise ratio, a ratio of a number of bytes successfully communicated during a time interval to an estimated maximum number of bytes that can be communicated in the time interval (the latter of which is sometimes referred to as the "capacity" of a communication channel or link), and/or a ratio of an actual data rate to an estimated data rate (which is sometimes referred to as "utilization").

Figure 2A:
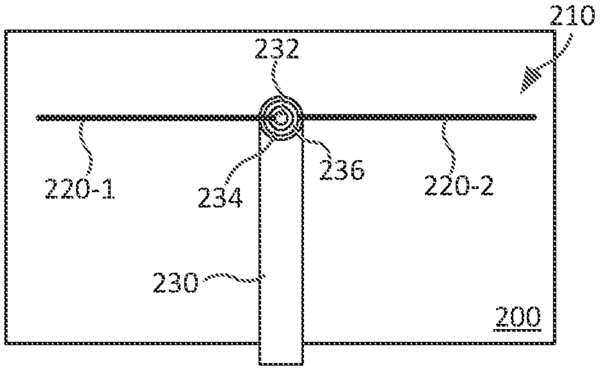
FIGS. 2A and 2B are schematic plan and side views, respectively, of a horizontally polarized dipole radiating element.
Figure 2B:
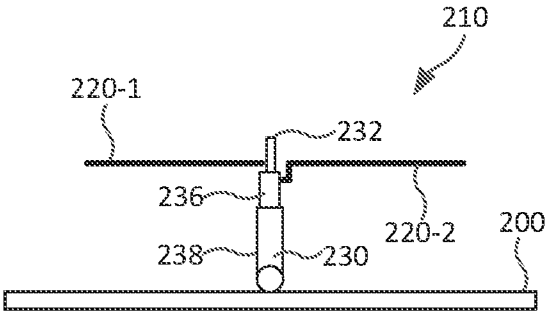

FIGS. 2A and 2B are schematic plan and side views, respectively, of a conventional horizontally polarized dipole radiating element 210 that is mounted above a ground plane 200. Dipole radiating element 210 includes a pair of dipole arms 220-1, 220-2 that are "center fed" by an RF transmission line in the form of a coaxial cable 230. Coaxial cable 230 is shown in FIGS. 2A-2B as running on and parallel to the ground plane 200 and then extending through a 90° bend to extend upwardly above the ground plane 200 to attach to the dipole arms 220. Each dipole arm 220 may have an electrical length of about ¼λ where λ is the wavelength corresponding to the center frequency of the operating frequency band of the dipole radiating element 210. Thus, dipole radiating element 210 may have an electrical length of about ½λ. The physical length of each dipole arm 220 may correspond to the electrical length, or may be smaller than the electrical length. For example, dipole arms 220 are often widened in a direction perpendicular to the longitudinal axis of the dipole arm 220, as this widening tends to increase the current path, allowing the overall physical length of the dipole arm to be shortened while maintaining an electrical length of about ¼λ. The dipole arms 220 may be implemented using any appropriate conductive structure such as, for example, metal rods, metal patterns on a printed circuit board, etc.

As shown best in FIG. 2B, dipole radiating element 210 may be mounted above ground plane 200. Ground plane 200 may comprise, for example, a metal layer (e.g., a metal layer on a printed circuit board) that is electrically grounded. Each dipole arm 220 may be mounted, for example, about ¼λ above the ground plane 200. Coaxial cable 230 is used to pass RF signals between dipole radiating element 210 and another device such as a radio (not shown). While in FIGS. 2A-2B a coaxial cable 230 is used to feed dipole radiating element 200, it will be appreciated that any appropriate RF transmission line structure may be used including, for example, microstrip RF transmission lines, stripline RF transmission lines, coplanar waveguide RF transmission lines, etc. Coaxial cable 230 includes a center or "signal" conductor 232, an outer or "ground" conductor 236, a dielectric spacer 234 that physically and electrically separates the signal conductor 232 from the ground conductor 236, and a protective outer cable jacket 238. The ground plane 200 carries the same signal as the ground conductor of coaxial cable 236.

As shown in FIGS. 2A-2B, dipole arm 220-1 is electrically connected to the signal conductor 232 of coaxial cable 230, while dipole arm 220-2 is electrically connected to the ground conductor 236 of coaxial cable 230. When an RF signal is input to coaxial cable 230, an alternating voltage is carried on the center signal conductor 232 that swings positive and negative relative to no excitation (relative the outside of the outer ground conductor 236). The alternating voltage on the signal conductor 232 generates an alternating current ("AC current") on the signal conductor 232. An equal but opposite AC current flows on the inside of the outer ground conductor 236 (i.e., the phase of the current flowing on the inside of the outer ground conductor 236 differs by 180° from the current flowing on the signal conductor 232). The current on the signal conductor 232 must travel back to the source and does so on the inside of the outer ground conductor 236. Thus, coaxial cable 230 "feeds" RF signals to and from dipole radiating element 210 "out-of-phase" since the electrical signals passed to the two dipole arms 220-1, 220-2 have phases that differ by 180°. The outer side of the outer ground conductor 236 is at a potential of 0 volts (i.e., at electrical "ground"). Since the outer side of the ground conductor 236 has no voltage, no current flows on the outer side of the ground conductor 236. The polarization of the RF energy radiated by a dipole radiating element is determined by the direction of the electric field around the radiating element. When dipole radiating element 210 is fed out-of-phase as is shown in FIGS. 2A-2B, the generated electrical field extends in parallel to the dipole arms, and hence parallel to the ground plane 200. This polarization is referred to as a horizontal polarization.

Figure 3:
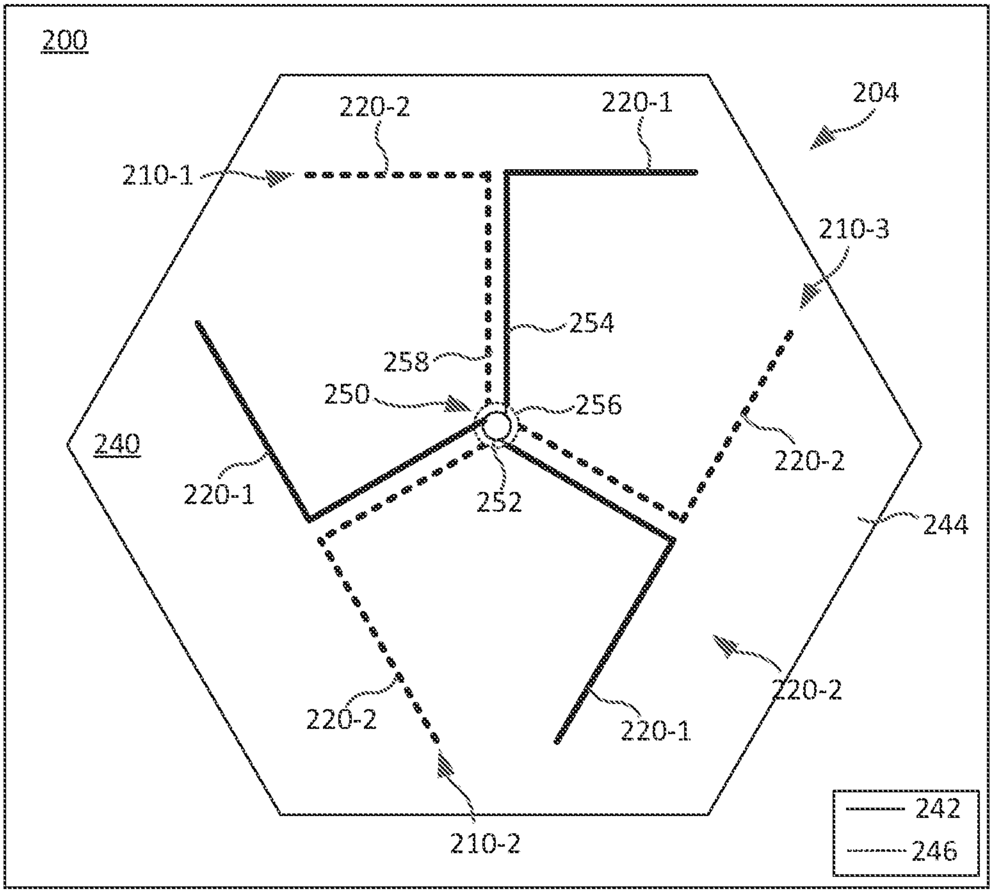
FIG. 3 is a schematic plan view of three horizontally polarized dipole radiating elements arranged as an Alford Loop.

While individual dipole radiating elements can be, and commonly are, used in access points, in many cases access points include antennas that comprise multiple dipole radiating elements that are arranged in a so-called Alford Loop or in other known arrangements. FIG. 3 is a schematic plan view of an antenna 204 for an access point that includes three dipole radiating elements 210-1 through 210-3 that are mounted above a ground plane 200 in an Alford Loop arrangement. As shown in FIG. 3, in an Alford Loop arrangement, the dipole radiating elements 210-1 through 210-3 are radially positioned about a common central feed point 250, and all three dipole radiating elements 210-1 through 210-3 are commonly fed from the common central feed point 250. In the depicted embodiment, the three dipole radiating elements 210-1 through 210-3 are formed in a printed circuit board 240. The first dipole arm 220-1 of each dipole radiating element 210 is formed on an upper metallization layer 242 of printed circuit board 240, while the second dipole arm 220-2 of each dipole radiating element 210 is formed on a lower metallization layer 246 of printed circuit board 240. The upper and lower metallization layers 242, 246 may be formed on opposed sides of a dielectric substrate 244 of printed circuit board 240.

The printed circuit board 240 may be mounted above the ground plane 200 (e.g., ¼λ above), and may extend in parallel with ground plane 200. A coaxial cable 230 (not shown in FIG. 3, but see FIGS. 2A-2B) may be soldered to printed circuit board 240 at the common central feeding point 250. In particular, the ground conductor 236 of coaxial cable 230 may be soldered to an annular metal ground pad 256 of the lower metallization layer 246, and the signal conductor 232 may extend through a hole in dielectric substrate 244 (not shown) and be soldered to a metal "signal" pad 252 of the upper metallization layer 242. Respective ground traces 258 may electrically connect the ground pad 256 to each of the second dipole arms 220-2, and respective signal traces 254 may electrically connect the signal pad 252 to each of the first dipole arms 220-1. The common central feeding point 250 may act as a 1×3 power divider that splits the RF energy on coaxial cable 230 into, for example, three equal magnitude sub-components that are passed to the three dipole radiating elements 210-1 through 210-3. In FIG. 3, the metallization of the lower metallization layer 246 is indicated using dashed lines, and the metallization of the upper metallization layer 242 is indicated using solid lines.

Figure 4A:
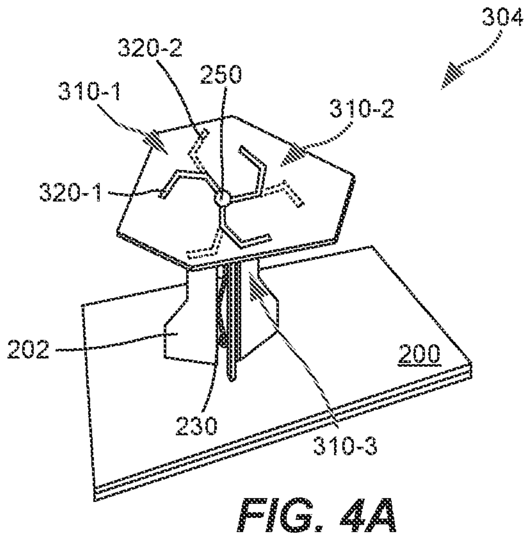
FIG. 4A is a schematic perspective view of an antenna for an access point.
Figure 4B:
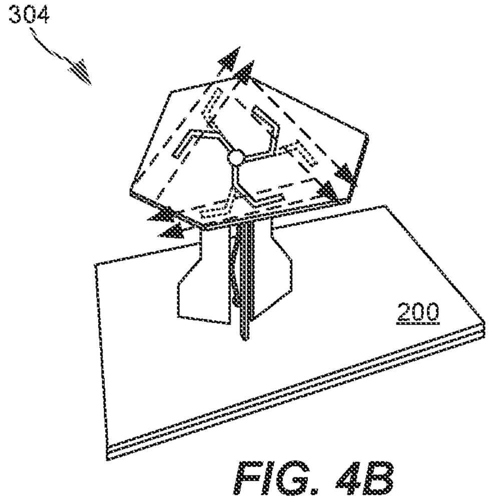
FIG. 4B is a schematic perspective view that illustrates the orientation of the electric fields that are formed when the dipole arms of the dipole radiating element of FIG. 4A are fed out-of-phase.
Figure 4C:
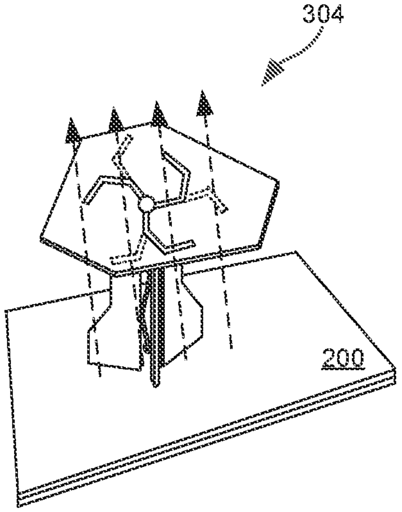
FIG. 4C is a schematic perspective view that illustrates the orientation of the electric fields that are formed when the dipole arms of the dipole radiating element of FIG. 4A are fed in-phase.

FIGS. 4A-4C are schematic perspective views of an access port antenna 304 that includes three horizontally disposed dipole radiating elements 310-1 through 310-3 arranged in an Alford Loop. The dipole arms of the radiating elements 310 may be fed either out-of-phase or in-phase to generate RF radiation having either a horizontal polarization or a vertical polarization with respect to an underlying ground plane 200.

Referring to FIG. 4A, the dipole radiating elements 310 are similar to the dipole radiating elements 210 shown in FIG. 3, except that the dipole radiating elements 310 include so-called "folded" dipole arms 320-1, 320-2 that are bent to reduce the overall "footprint" of antenna 304 (herein, the footprint of an antenna refers to the smallest square that encloses the antenna when the antenna is viewed in plan view). The dipole radiating elements 310 are mounted above a ground plane 200 by a plurality of supports 202. A coaxial cable 230 is connected to a common central feed point 250 of the Alford Loop in the same manner discussed above with reference to FIG. 3. Since, aside from the different shaped dipole arms, the antenna 304 of FIGS. 4A-4C is identical to the antenna 204 discussed above with respect to FIG. 3, further description thereof will be omitted here.

Referring to FIG. 4B, when the dipole arms 320 of each dipole radiating element 310 are each fed out-of-phase in the manner discussed above with reference to FIG. 3, the electric field of the radiated RF energy emitted by each dipole radiating element 310 extends in parallel to the respective dipole radiators 320. Each dipole radiating element 310 therefore emits a horizontally polarized RF signal, as the electric field thereof is parallel to the ground plane 200. The directions of the electric fields emitted by the dipole radiating elements 310 are shown using dashed arrows in FIG. 4B.

Referring to FIG. 4C, if the dipole arms 320 are fed in-phase instead of out-of-phase, the electric field of the radiated RF energy emitted by each dipole radiating element 310 extends perpendicular to the ground plane 200, as shown by the dashed arrows. Each dipole radiating element 310 therefore emits a vertically polarized RF signal when the dipole arms 320 are fed in-phase. Thus, by changing how the dipole radiating elements 310 are fed, it is possible to selectively have the same dipole radiating elements 310 emit RF radiation that is either horizontally polarized or vertically polarized with respect to the ground plane 200.

A variety of different techniques may be used to selectively feed the dipole arms of a dipole radiating element either in-phase or out-of-phase. A dipole radiating element may be fed out-of-phase by, for example, coupling the signal conductor and the ground conductor of a "feed" RF transmission line to the respective first and second dipole arms of the dipole radiating element. Conversely, a dipole radiating element may be fed in-phase by coupling the signal conductor of the feed RF transmission line to both the first and second dipole arms of the radiating element. In other cases, a dipole radiating element may be fed in-phase by coupling the signal conductor of the feed RF transmission line to the first dipole arm and coupling the ground conductor of the feed RF transmission line to the second dipole arm through a 180° phase delay element. In still other embodiments, the coaxial feed cable 230 (or other RF feed) may be coupled to a balun to force the currents at the balanced output of the balun to be equal and opposite, which greatly reduces any residual current that would flow on the outside of the outer conductor 236. The balun also forces the voltages at each end of the load to be exactly opposite (V/2 and −V/2). It should be noted, however, that if the dipole arms 220 are equal in length and width, they are self-balancing, and the need for a balun may be eliminated.

Figure 5A:
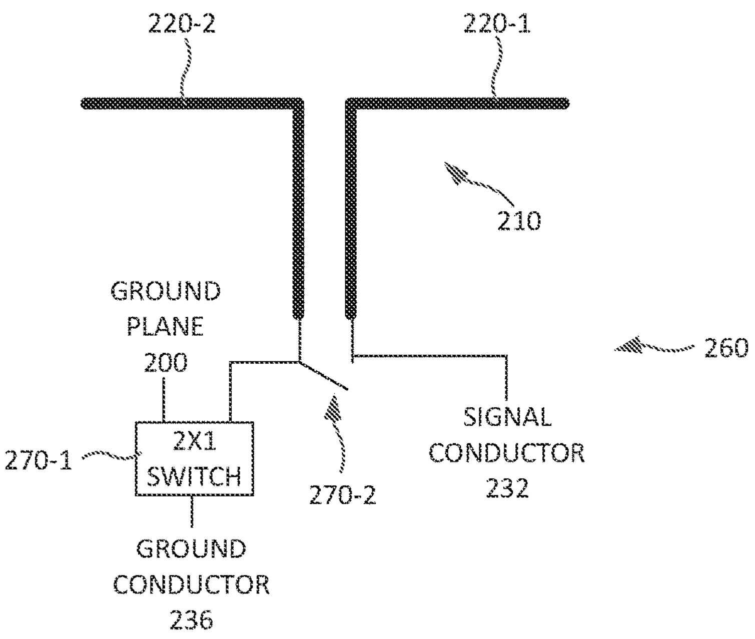
FIG. 5A is a schematic block diagram of a feed network for a dipole radiating element according to embodiments of the present invention.

FIG. 5A is a schematic block diagram of a feed network 260 according to embodiments of the present invention that can be used to selectively feed the dipole arms 220 of a dipole radiating element 210 either in-phase or out-of-phase. The feed network 260 may be connected to a feed transmission line 230 (e.g., a coaxial cable or a microstrip transmission line) that in turn is connected (either directly or indirectly) to a port of a radio. For purposes of FIG. 5A, it is assumed that the feed transmission line is a coaxial cable 230 having a center "signal" conductor 232 and an outer "ground" conductor 236. As shown in FIG. 5A, the signal conductor 232 of the feed transmission line 230 is electrically connected to the first dipole arm 220-1. The ground conductor 236 of the feed transmission line 230 is electrically connected to the input of a first switch 270-1, which may, for example, be a single pole double throw switch. A first output of the first switch 270-1 is electrically connected to a ground plane 200 (FIGS. 2A-2B and 3), while the second output of the first switch 270-1 is electrically connected to the second dipole arm 220-2. A second switch 270-2 is provided that can selectively electrically connect the signal conductor 232/first dipole arm 220-1 to the second dipole arm 220-2. The second switch 270-2 may comprise, for example, a single pole single throw switch. The second switch 270-2 may be implemented using, for example, a PIN diode. In order to feed dipole radiating element 210 out-of-phase, the first switch 270-1 may be set to connect the ground conductor 236 of feed transmission line 230 to the second dipole arm 220-2, and the second switch 270-2 is set to its "open" position (i.e., a position in which the signal conductor 232 is not electrically connected to the second dipole arm 220-2). In order to feed dipole radiating element 210 in-phase, the first switch 270-1 may be set to connect the ground conductor 236 to the ground plane 200, and the second switch 270-2 is set to its "closed" position (i.e., a position in which the signal conductor 232 is electrically connected to the second dipole arm 220-2). Thus by simply controlling the first and second switches 270-1, 270-2, the feed network 260 can selectively feed dipole radiating element 210 either in-phase or out-of-phase.

Figure 5B:
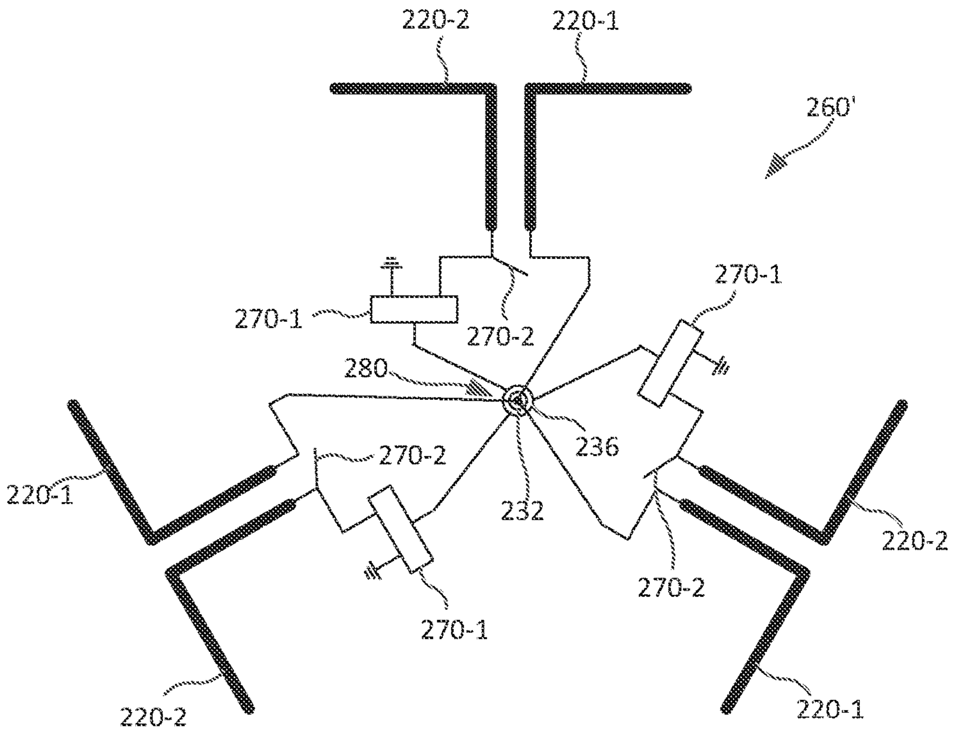
FIG. 5B is a schematic block diagram of a feed network according to embodiments of the present invention for three dipole radiating elements configured in an Alford Loop.

FIG. 5B is a schematic block diagram of a feed network 260' according to embodiments of the present invention that can feed the three dipole radiating elements 210 of an Alford Loop either in-phase or out-of-phase. The feed network 260' of FIG. 5B simply adds a 1×3 power divider 280 to the feed network 260 of FIG. 5B. The signal conductor 232 of the feed transmission line 230 is coupled to the input of the 1×3 power divider 280. The three outputs of power divider 280 are coupled to the first dipole arms 220-1 of the respective first through third dipole radiating elements 220-1. The ground conductor 236 of feed transmission line 230 is electrically connected to the inputs of three first switches 270-1. A first output of each first switch 270-1 is electrically connected to the ground plane 200, while the second output of each first switch 270-1 is electrically connected to the second dipole arm 220-2 of a respective one of the three dipole radiating elements 210. Three second switches 270-2 are provided that can selectively electrically connect the signal conductor 232 to the respective second dipole arms 220-2.

Figure 6A:
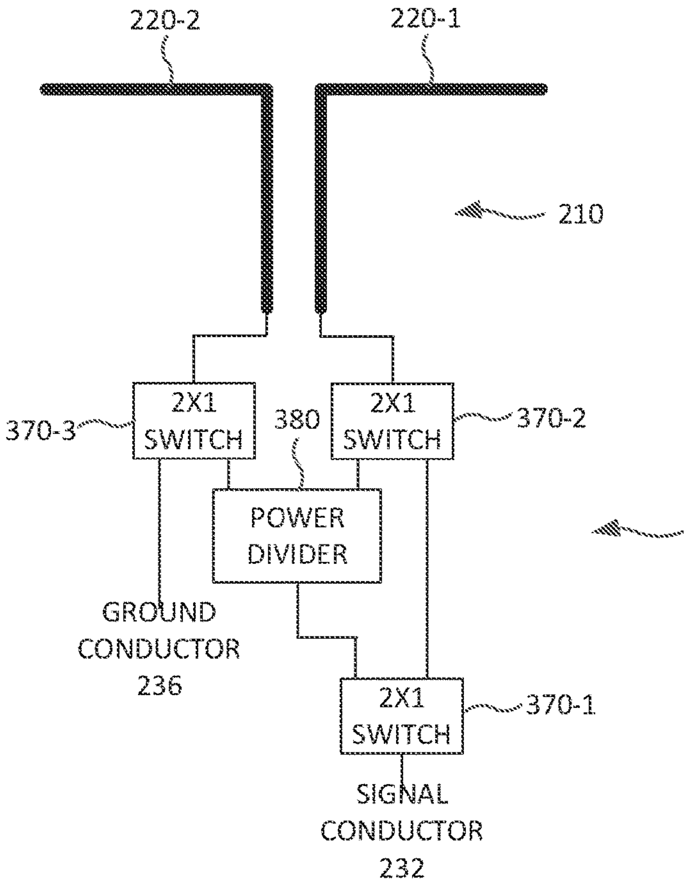
FIG. 6A is a schematic block diagram of another feed network for a dipole radiating element according to embodiments of the present invention.

FIG. 6A is a schematic block diagram of a feed network 360 according to further embodiments of the present invention that can be used to selectively feed a dipole radiating element 210 either in-phase or out-of-phase. As shown in FIG. 6A, the signal conductor 232 of a feed transmission line 230 is electrically connected to the input of a first single pole double throw switch 370-1. A first output of first switch 370-1 is connected to a first input of a second single pole double throw switch 370-2, and a second output of the first switch 370-1 is coupled to an input of a 1×2 power divider 380. The first output of power divider 380 is coupled to the second input of the second switch 370-2, and the output of the second switch 370-2 is coupled to the first dipole arm 220-1. The ground conductor 236 of feed transmission line 230 is electrically connected to a first input of a third single pole double throw switch 370-3. The second output of power divider 380 is electrically connected to the second input of third switch 370-3. The output of third switch 370-3 is electrically connected to the second dipole arm 220-2. In order to feed the dipole arms 220 dipole radiating element 210 out-of-phase, the input of first switch 370-1 is connected to the first output of first switch 370-1, the first input of second switch 370-2 is connected to the output of second switch 370-2, and the first input of third switch 370-3 is connected to the output of third switch 370-3. In order to feed dipole radiating element 210 in-phase, the positions of each of the first through third switches 370-1, 370-2, 370-3 are flipped to the opposite positions.

Figure 6B:
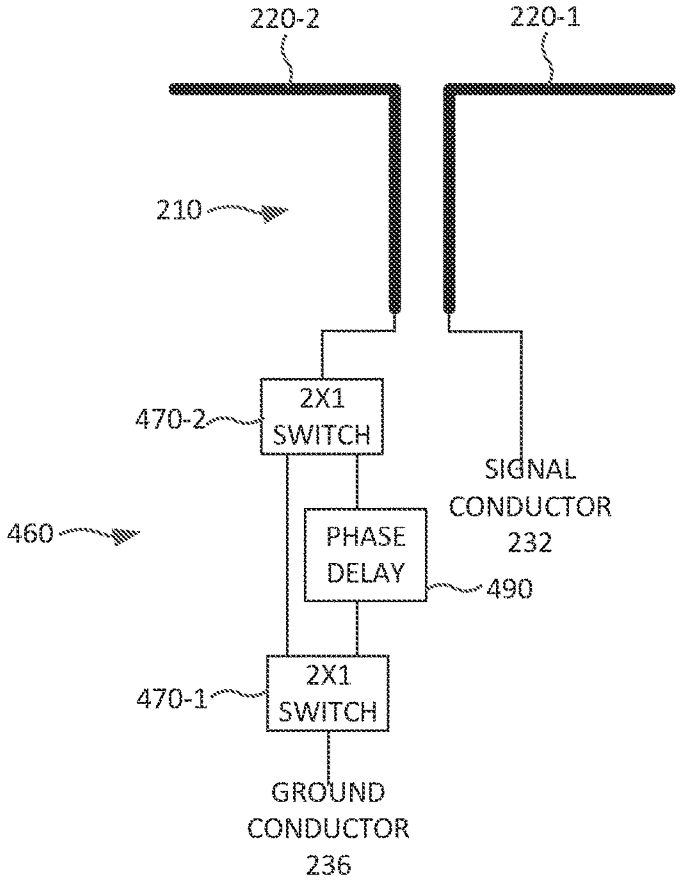
FIG. 6B is a schematic block diagram of yet another feed network for a dipole radiating element according to embodiments of the present invention.

FIG. 6B is a schematic block diagram of a feed network 460 according to additional embodiments of the present invention that can be used to selectively feed the dipole arms 220 of dipole radiating element 210 either in-phase or out-of-phase. Feed network 460 differs from feed networks 260 and 360 in that instead of coupling the signal conductor to both the first and second dipole arms 220-1, 220-2 to feed the dipole radiating element 210 in-phase, feed network 460 applies a 180° phase delay to the signal carried by the ground conductor 236.

As shown in FIG. 6B, the signal conductor 232 of the feed transmission line 230 is electrically connected to the first dipole arm 220-1. The ground conductor 236 of feed transmission line 230 is electrically connected to an input of a first single pole double throw switch 470-1. The first output of first switch 470-1 is electrically connected to a first input of a second single pole double throw switch 470-2. The second output of first switch 470-1 is electrically connected to a 180° phase delay element 490. The output of the 180° phase delay element 490 is electrically connected to the second input of the second switch 470-2. The output of the second switch 470-2 is electrically connected to the second dipole arm 220-2. In order to feed the dipole arms 220-1, 220-2 of dipole radiating element 210 out-of-phase, the input of first switch 470-1 is connected to the first output of first switch 470-1, and the first input of second switch 470-2 is connected to the output of second switch 470-2. In order to feed the dipole arms 220-1, 220-2 of dipole radiating element 210 in-phase, the positions of each of the first and second switches 470-1, 470-2 are flipped to the opposite positions.

The phase delay element 490 may be implemented in a variety of different ways. In some embodiments, the phase delay element 490 may simply comprise an RF transmission line segment that has a length and other properties (e.g., dielectric constant) that will cause an RF signal at the center frequency of the operating frequency band for the dipole radiating element 210 to change by 180° when traversing the RF transmission line segment. Other phase delay elements 490 may be used such as, for example, transformers or lumped circuit elements that are configured to change a phase of an input RF signal by 180°.

Figure 7:
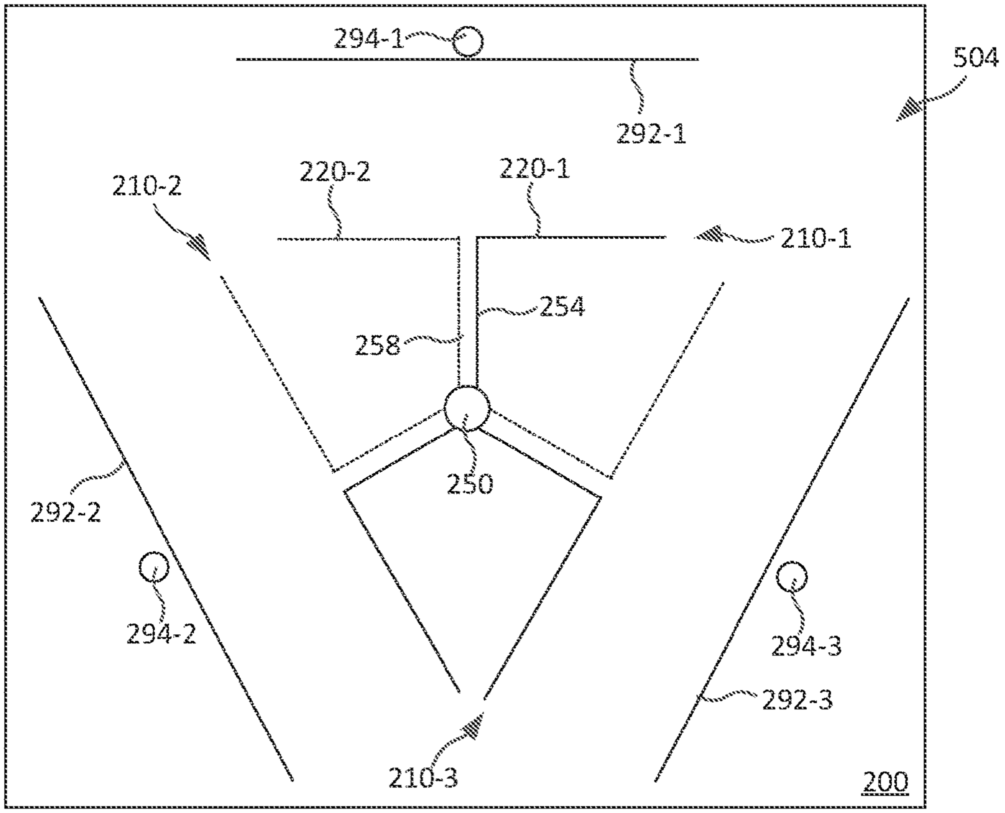
FIG. 7 is a schematic plan view of three dipole radiating elements arranged in an Alford Loop that can be used in the access points according to embodiments of the present invention.

FIG. 7 is a schematic plan view of an antenna 504 according to embodiments of the present invention that includes three radiating elements 210-1 through 210-3 arranged in an Alford Loop. As described above, the access points according to embodiments of the present invention use both polarization diversity and directional antenna patterns to provide enhanced throughput. Polarization diversity is achieved by configuring the radiating elements 210 of each antenna of the access point so that they can selectively be set to radiate at one of two orthogonal polarizations. The radiating element(s) 210 of each antenna in the access point may be set to the polarization that will optimize performance for the transmit/receive chain associated with the antenna.

The access points according to embodiments of the present invention may have antennas that include switched parasitic pattern shaping elements such as directors and/or reflectors. The parasitic pattern shaping elements can be selectively activated to modify the radiation patterns generated by the radiating elements, thereby allowing the antenna to generate directional antenna patterns that have higher gain in the direction of selected client devices. Directors are conductive elements that may be selectively connected to a ground plane through an electronic switch such as a PIN diode. Each director may be positioned adjacent a respective radiating element and may be used to selectively effect the radiation pattern emitted by the radiating element. Typically, a director is slightly shorter than a dipole radiator of its associated dipole radiating element (e.g., the length of the director may be about 0.45λ, where the dipole radiator may have a length of about 0.5λ). When not electrically connected to the ground plane (i.e., when the switch is open), the director may be essentially invisible to the nearby radiating element, and will have little or no impact on the radiation pattern formed by the radiating element. However, if the switch is closed so that the director is coupled to the ground plane, the director acts to distort (shape) the radiation pattern in the direction of the director, thereby increasing the gain of the radiation pattern in the direction of the director and decreasing the gain in other directions.

Reflectors, in contrast, are conductive elements that reflect some of the RF energy emitted by a radiating element back toward the radiating element, thereby increasing the gain of the radiation pattern in a direction opposite of a vector extending between the radiating element and the reflector and reducing the gain in the direction of the reflector. Typically, a reflector is slightly longer than the dipole radiator of an associated radiating element (e.g., a length of about 0.552λ. More than one parasitic pattern shaping element may be located adjacent each radiating element. An access point may include a controller that is used to control the individual switches that selectively connect the parasitic pattern shaping elements to the ground plane in order to use the reflectors or directors to selectively shape the radiation patterns generated by the radiating elements of the access point.

Referring to FIG. 7, the antenna 504 includes three commonly fed dipole radiating elements 210 that are configured as an Alford Loop. Each dipole radiating element 210 is mounted above a ground plane 200 (e.g., mounted a distance of ¼λ above the ground plane 200), where the ground plane 200 may, for example, comprise a ground plane of a main printed circuit board of an access point.

The three dipole radiating elements 210 are fed from a central feed point 250. The central feed point 250 may act as a power divider that divides an input RF signal into three sub-components that are fed to the dipole radiating elements 210 via respective feed lines 254, 258. All three dipole radiating elements 210 may all have the same amplitudes and phases. Since the three dipole radiating elements 210 are fed with equal amplitude, same phase sub-components of an RF signal, the radiation pattern generated by the antenna 504 is symmetric in the azimuth plane at low elevation angles, which is desirable.

Respective first reflectors 292-1 through 292-3 are positioned radially outward of dipole radiating element 210-1 through 210-3. Each first reflector 292 may substantially extend in parallel to the dipole arms 220-1, 220-2 of a respective one of the dipole radiating elements 210 and, in some embodiments, may be coplanar with the dipole arms 220 (i.e., the dipole arms 220 and the first reflectors 292 are at the same height above the ground plane 200). Each first reflector 292 is associated with a respective one of the dipole radiating elements 210 and configured to selectively shape the radiation pattern of the RF energy emitted by their associated dipole radiating elements 210 when the dipole radiating element 210 emits horizontally polarized RF radiation. Each first reflector 292 may be coupled to the ground plane 200 through a switch (not shown) such as a PIN diode. Each first reflector 292 may comprise, for example, a metal trace that is formed on a printed circuit board, and may be positioned, for example, at a distance of less than 0.52λ outwardly of the dipole arms 220 of their associated dipole radiating element 210. When electrically connected to the ground plane 200, each first reflector 292 acts to reflect some of the outwardly directed radiation inwardly, thereby decreasing the gain of the radiation pattern of the associated dipole radiating element 210 in the direction toward the first reflector 292, and increasing the gain of the radiation pattern in the opposite direction.

As is further shown in FIG. 7, respective second reflectors 294-1 through 294-3 are also positioned radially outward of dipole radiating elements 210-1 through 210-3. The second reflectors 294 may be mounted to extend upwardly from the ground plane 200 and may be substantially perpendicular to the ground plane 200. Each second reflector 294 is associated with a respective one of the dipole radiating elements 210 and configured to selectively shape the radiation pattern of the RF energy emitted by their associated dipole radiating elements 210 when the dipole radiating element 210 emits vertically polarized RF radiation. Each second reflector 294 may be coupled to the ground plane 200 through a switch such as a PIN diode. Each second reflector 294 may comprise, for example, a thin piece of metal, and may be positioned, for example, at a distance of less than 0.5λ outwardly of the dipole arms 220 of their associated dipole radiating element 210. When electrically connected to the ground plane 200, each second reflector 294 acts to reflect some of the outwardly directed radiation inwardly, thereby decreasing the gain of the radiation pattern of the associated dipole radiating element 210 in the direction toward the second reflector 294, and increasing the gain of the radiation pattern in the opposite direction.

While FIG. 7 illustrates an antenna 504 that uses reflectors 292, 294 to selectively shape the radiation patterns emitted by the dipole radiating elements 210, it will be appreciated that embodiments of the present invention are not limited thereto. For example, in other embodiments, directors may be used in place of the reflectors 292, 294, or a combination of reflectors and directors may be used. It will also be appreciated that the number of directors/reflectors provided per radiating element 210 may be changed from that which is shown in FIG. 7. In still other embodiments, the directors/reflectors may be omitted, and the radiation pattern may instead be shaped by selectively feeding RF signals to only some of the radiating elements 210 in antenna 504.

While FIG. 7 illustrates an antenna that includes three dipole radiating elements 210 in an Alford Loop configuration, it will be appreciated that different number of dipole radiating elements 210 may be used. For example, in other embodiments, four dipole radiating elements 210 may be arranged in an Alford Loop configuration, with each dipole radiating element 210 angularly separated from adjacent dipole radiating elements 210 by angles of 90°. The number of dipole radiating elements 210 included in an antenna having an Alford loop arrangement impacts the amount of ripple in the azimuth pattern of the antenna beam generated by the antenna, where the "ripple" refers to the variation in the peak gain as a function of direction. Generally speaking, the more dipole radiating elements included in the antenna, the smaller the amount of ripple. In most applications, three dipole radiating elements may provide sufficiently low levels of ripple.

Figure 8:
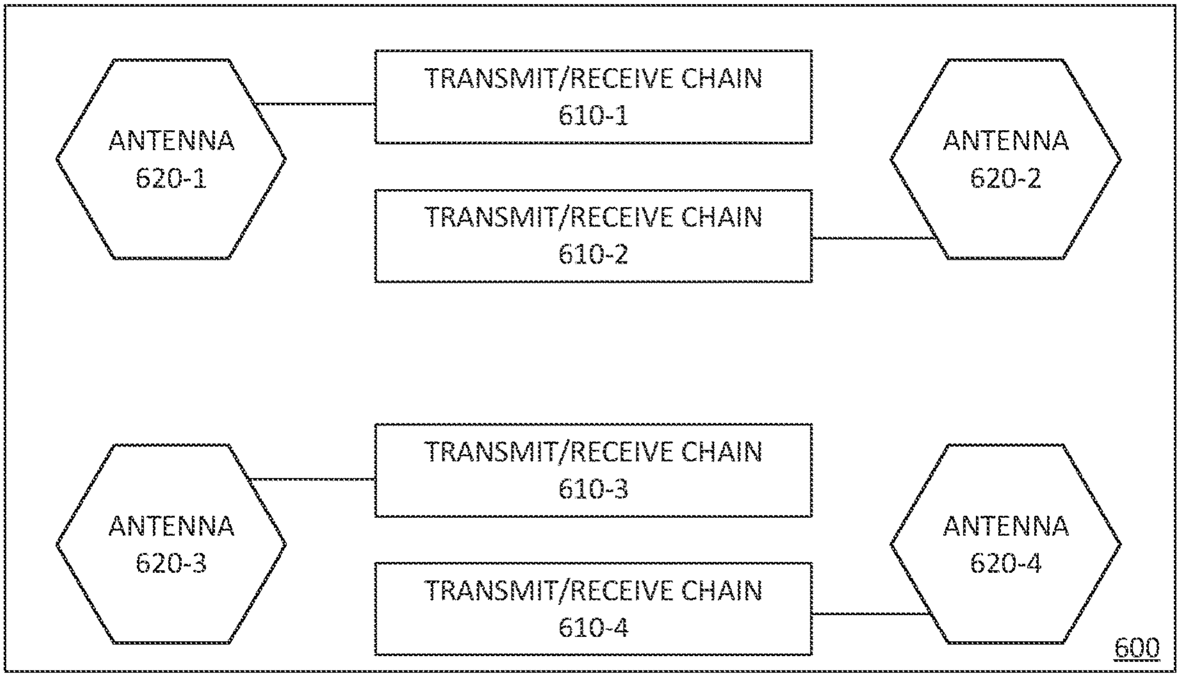
FIG. 8 is a block diagram of an access point according to embodiments of the present invention that is configured for 4×MIMO operation.

FIG. 8 is a block diagram of an access point 600 according to embodiments of the present invention that is configured for 4×MIMO operation. As shown in FIG. 8, the access point 600 includes four transmit receive chains 610-1 through 610-4. Each transmit/receive chain 610 may include a radio and associated electronics, and is coupled to a respective one of four antennas 620-1 through 620-4. Each antenna 620 may comprise a single radiating element or multiple radiating elements. In example embodiments, each antenna 620 may be implemented using the antenna 504 of FIG. 7, where each antenna 504 includes the feed network 260' discussed above with reference to FIG. 5B. However, it will be appreciated that each antenna 620 may comprise any antenna that has (1) a feed network that allows the radiating elements thereof to be selectively configured to radiate RF energy at one of at least two polarization and (2) an adjustable radiation pattern. It will also be appreciated that the antennas may comprise single-band antennas, dual-band antennas or tri-band antennas. A dual-band antenna refers to an antenna that operates in two of the WiFI frequency bands, and a tri-band antenna refers to an antenna that operates in three of the WiFI frequency bands. Radiating elements that operate in, for example, two of the WiFi frequency bands are well known in the art. A single-band implementation is illustrated in FIG. 8. If dual-band antennas are used instead, then the number of transmit/receive chains 610 would double, with two transmit/receive chains 610 coupled to each antenna 620 (one for each frequency band). The polarization and radiation pattern are optimized for each antenna, for each client device, and for each frequency band. Typically, each client device will only operate at a given time in a single frequency band, and hence it is only necessary to select the polarization and radiation pattern that optimizes performance for that client device in the frequency band that is being used by the client device.

The four transmit/receive chains 610 allow access point 600 to communicate using 4×MIMO techniques. In particular, a data stream that is to be transmitted to a first client device may be broken into four sub-streams that are coded and transmitted to the first client device using the respective four transmit/receive chains 610 and antennas 620. As is further shown in FIG. 8, each antenna 620 may be spatially separated from the other antennas 620 by a sufficient amount to ensure that the four MIMO streams will be decorrelated from each other. All four antennas 620 may need to be spatially separated from each other since any two antennas 620 may or may not have polarization diversity with respect to each other when access point 600 is transmitting data to certain client devices, and since the radiating elements of each antenna may be independently set to transmit at the polarization that will optimize performance of the transmit/receive chain 610 coupled to the antenna 620 that the radiating element is part of. The polarization of the dipole radiating elements included in each of the four antennas, as well as the radiation pattern for each antenna, may be selected to optimize a performance criteria such as throughput, for communications with each client device associated with access point 600. Thus, when access point 600 is transmitting data to a first client device, the antennas 620-1 through 620-4 may be configured a first way (e.g., antennas 620-1, 620-2 and 620-4 transmit at a vertical polarization while antenna 620-3 transmits at a horizontal polarization, and each antenna 620 is configured to generate a respective radiation pattern that is set to optimize the performance criteria for transmission to the first client device), and when access point 600 is transmitting data to a second client device, the antennas 620-1 through 620-4 may be configured a second way (e.g., all four antennas 620-1 through 620-4 transmit at a horizontal polarization, and each antenna 620 is configured to generate a respective radiation pattern that is set to optimize the performance criteria for transmission to the second client device).

In some embodiments, the polarization and the radiation pattern may be optimized separately for each antenna for each associated client device. In such embodiments, either the polarization or radiation pattern may be selected first, and then the other of the polarization or radiation pattern may be selected. For example, the polarization for the first antenna 620-1 may be selected by transmitting first data to a first client device with the first antenna 620-1 fed to radiate at a first polarization, transmitting second data to the first client device with the first antenna 620-1 fed to radiate at a second (orthogonal) polarization, and then determining which of these two transmissions performed better with respect to a selected performance criteria. Whichever polarization provided the better performance is then used for transmissions through the first antenna 620-1 to the first client device. The same technique may be used to determine the polarization that the first antenna 620-1 will use for transmission with respect to each of the other associated client devices. The access point will also periodically transmits RF signals to each associated client device with the dipole radiating elements set to the non-selected one of the polarizations to confirm that the "best" polarization for the first antenna 620-1 for each associated client device has not changed (e.g., due to movement of the transmitting or receiving electronic device or due to changes in the channel conditions). When one of these "tests" indicates that the other polarization now provides better performance for transmissions to a certain client device, the access point then starts to use the other polarization for transmissions through the first antenna 620-1 to that client device. A wide variety of different algorithms may be used to determine when and/or how often the access point periodically transmits RF signals to an associated client device using the non-selected polarization (e.g., after a predefined interval, when the performance metric of transmissions using the selected polarization falls below a threshold, etc.). Once the polarization is selected for use with transmissions from the access point to a particular client device, a radiation pattern for the transmissions and a transmit data rate may be selected. These may be selected using conventional radiation pattern selection algorithms that are known in the art. This process may be performed for antennas 620-2 through 620-4.

In other embodiments, the polarization and radiation pattern for an antenna may be simultaneously selected using a combined optimization algorithm. The combined optimization algorithm may, for example, transmit data through the antenna to a first client device using various combinations of polarization, radiation patterns and transmit data rates to determine a combination that optimizes a performance criteria. These algorithms typically do not test all possible combinations, but instead test a small number of the possible combinations in a manner that is likely to quickly identify one of the best possible combinations. Using a combined optimization algorithm may provide improved performance.

While the discussion above has focused on using the selected polarization and radiation pattern for transmissions from the access point to the associated client devices, it will be appreciated that the identified combinations of polarizations and radiation patterns may also be used when the access point is receiving transmissions from the respective associated client devices.

Figure 9:
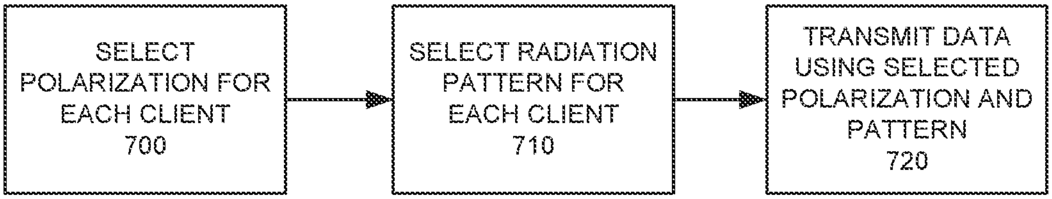
FIG. 9 is a flow chart illustrating a method for operating an access point according to embodiments of the present invention.

FIG. 9 is a flow chart illustrating a method according to embodiments of the present invention for operating an access point. The access point may include at least one transmit/receive chain and an associated antenna that includes at least a first radiating element. As shown in FIG. 9, operations may begin with the access point selecting polarizations for the first radiating element that will be used for RF transmissions through the first radiating element to each of a plurality of client devices that are associated with the access point (Block 700). The polarization that is selected for use with the transmissions to each respective client may be selected as the polarization that is expected to optimize a performance parameter (e.g., throughput) for transmissions from the access point (through the first radiating element) to the respective associated client device.

As further shown in FIG. 9, according to these methods, respective radiation patterns for the first radiating element are selected that will be used for the RF transmissions from the access point to each of the client devices (Block 710). The radiation patterns may be selected from a group of discrete radiation patterns that may be generated using the first radiating element, and the radiation pattern that is selected for use with the transmissions to each respective associated client may be selected as the radiation pattern that is expected to optimize a performance parameter (e.g., throughput) for transmissions from the access point (through the first radiating element) to the respective client device. In some embodiments, the polarizations for the first radiating element and the radiation patterns for the first radiating element may be selected independently of each other. In other embodiments, a combined algorithm is used that selects, for each client device, the polarization and radiation pattern for the first radiating element that are expected to optimize a predetermined performance parameter. Once the polarizations and radiation patterns for the first radiating element have been selected, the access point may transmit RF signals to one or more of the associated client devices using the respective selected polarizations and radiation patterns for the first radiating element (Block 720).

Figure 10:
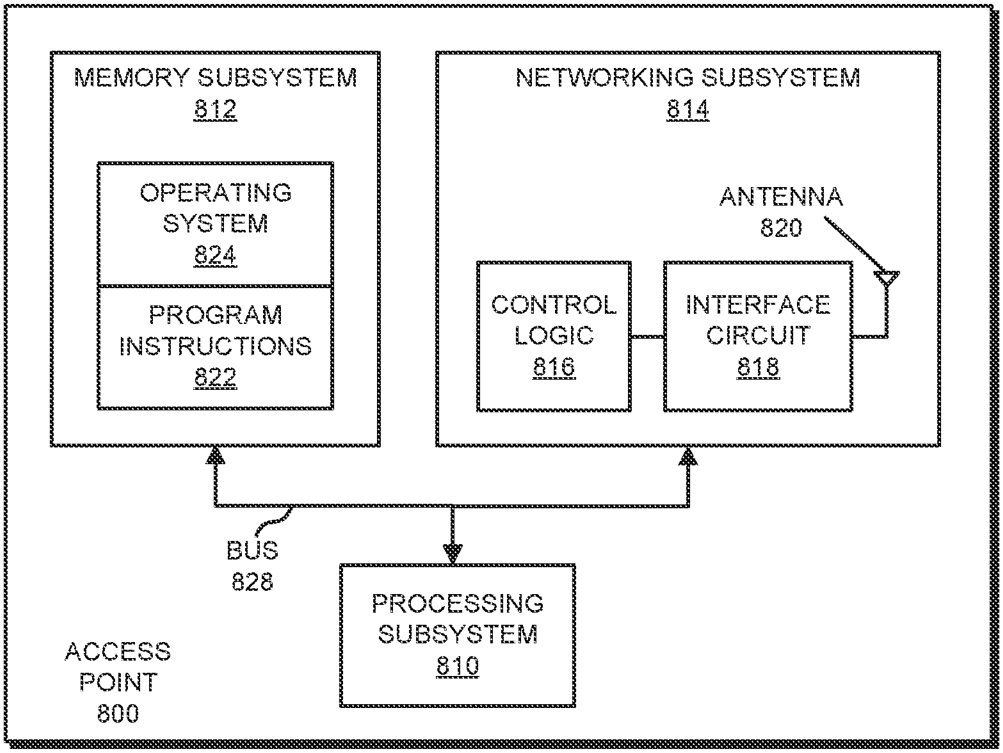
FIG. 10 is a block diagram of an access point according to embodiments of the present invention.

FIG. 10 is a block diagram illustrating an access point 800 in accordance with some embodiments. The access point 800 includes a processing subsystem 810, a memory subsystem 812, and a networking subsystem 814. Processing subsystem 810 includes one or more devices configured to perform computational operations. Memory subsystem 812 includes one or more devices for storing data and/or instructions. In some embodiments, the instructions may include an operating system and one or more program modules which may be executed by processing subsystem 810.

Networking subsystem 814 includes one or more devices configured to couple to and communicate on a wired and/or wireless network (i.e., to perform network operations), including: control logic 816, an interface circuit 818 and one or more radiating elements 820. Thus, electronic device 800 may or may not include the one or more radiating elements 820. Networking subsystem 814 includes at least a networking system based on the standards described in IEEE 802.11 (e.g., a Wi-Fi networking system).

Networking subsystem 814 includes processors, controllers, radios/radiating elements, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Access point 800 may use the mechanisms in networking subsystem 814 for performing simple wireless communication, e.g., transmitting frames and/or scanning for frames transmitted by other electronic devices.

Processing subsystem 810, memory subsystem 812, and networking subsystem 814 are coupled together using bus 828. Bus 828 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, the selection of the polarizations and radiation patterns for the antennas of the access point may be performed in hardware and/or software. At least some of the operations in the communication techniques may be implemented using program instructions 822, operating system 824 (such as a driver for interface circuit 818) or in firmware in interface circuit 818. Alternatively or additionally, at least some of the operations in the communication techniques may be implemented in a physical layer, such as hardware in interface circuit 818.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Herein, the term "substantially" is used to mean within 10%. Thus, for example, a first element that is mounted to extend substantially perpendicularly to a second element may be mounted at an angle between 80° and 100° with respect to the second element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An access point, comprising:

a ground plane;

an antenna that includes at least a first radiating element, the first radiating element including a first pair of dipole arms that are mounted above the ground plane; and a feed network that is connected to the antenna, wherein the feed network is selectively configurable to feed the first pair of dipole arms either in-phase or out-of-phase, wherein the first pair of dipole arms are configured to radiate radio frequency ("RF") energy having a horizontal polarization with respect to the ground plane when fed out-of-phase and to radiate RF energy having a vertical polarization with respect to the ground plane when fed in-phase.

2. The access point of claim 1, wherein the access point is configurable to generate a selected one of a plurality of different radiation patterns, and the access point is configured to select, for each of a plurality of client devices, a combination of a polarization for the first radiating element and a radiation pattern for the antenna that are used for transmission of RF signals from the access point to each of the client devices.

3. The access point of claim 1, the antenna further comprising a first parasitic pattern shaping element and a second parasitic pattern shaping element that are each configured to selectively shape a radiation pattern of the first radiating element, where the first parasitic pattern shaping element extends substantially in parallel to the ground plane, and the second parasitic pattern shaping element extends substantially perpendicular to the ground plane.

4. The access point of claim 3, wherein the first parasitic pattern shaping element is configured to be selectively coupled to the ground plane and the second parasitic pattern shaping element is configured to be selectively coupled to the ground plane.

5. The access point of claim 1, wherein the antenna further comprises at least a second dipole radiating element and a third dipole radiating element that together with the first dipole radiating element form at least part of an Alford Loop, the second dipole radiating element including a second pair of dipole arms that are mounted above the ground plane, and the third dipole radiating element including a third pair of dipole arms that are mounted above the ground plane, and wherein the feed network is selectively configurable to feed all of the first through third pairs of dipole arms either in-phase or out-of-phase.

6. The access point of claim 5, the antenna further comprising:

a first parasitic pattern shaping element that is selectively configured to shape first radiation patterns emitted by the first radiating element that have a horizontal polarization with respect to the ground plane; and a second parasitic pattern shaping element that is selectively configured to shape second radiation patterns emitted by the first radiating element that have a vertical polarization with respect to the ground plane.

7. The access point of claim 6, wherein the first parasitic pattern shaping element comprises a first reflector that is mounted radially outwardly of the first radiating element and has a longitudinal axis that extends substantially in parallel with the ground plane, and the second parasitic pattern shaping element comprises a second reflector that is mounted radially outwardly of the first radiating element and has a longitudinal axis that extends substantially perpendicular to the ground plane.

8. The access point of claim 5, wherein the antenna is configurable to generate a selected one of a plurality of different radiation patterns, and the access point is configured to select, for each of a plurality of client devices, a combination of a polarization and a radiation pattern for the antenna that are used for transmission of radio frequency ("RF") signals from the access point to each of the client devices.

9. An access point, comprising:

a ground plane;

an antenna that includes at least a first radiating element, the first radiating element including a first pair of dipole arms that are mounted above the ground plane;

a feed network that is connected to the antenna, wherein the first radiating element is selectively configurable to transmit and receive radio frequency ("RF") signals having a horizontal polarization with respect to the ground plane or a vertical polarization with respect to the ground plane, and wherein the antenna further comprises at least a second dipole radiating element and a third dipole radiating element that together with the first dipole radiating element form at least part of an Alford Loop, the second dipole radiating element including a second pair of dipole arms that are mounted above the ground plane, and the third dipole radiating element including a third pair of dipole arms that are mounted above the ground plane, wherein the feed network is selectively configurable to feed all of the first through third pairs of dipole arms either in-phase or out-of-phase.

10. The access point of claim 9, wherein the antenna is configurable to generate a selected one of a plurality of different radiation patterns, and the access point is configured to select, for each of a plurality of client devices, a combination of a polarization for the first radiating element and a radiation pattern for the antenna that are used for transmission of RF signals from the access point to each of the client devices.

11. The access point of claim 9, further comprising first through third pairs of parasitic pattern shaping elements that are mounted radially outwardly of the respective first through third dipole radiating elements, each pair of parasitic pattern shaping elements including a first parasitic pattern shaping element that is configured to shape radiation patterns emitted by the first radiating element that have a horizontal polarization with respect to the ground plane and a second parasitic pattern shaping element that is configured to shape radiation patterns emitted by the first radiating element that have a vertical polarization with respect to the ground plane.

12. The access point of claim 9, wherein the first pair of dipole arms comprises a first dipole arm and a second dipole arm, and wherein the feed network includes:

a first switch having an input, a first output that is electrically connected to the second dipole arm, and a second output that is electrically connected to the ground plane; and a first radio frequency ("RF") transmission line that includes a signal conductor that is electrically connected to the first dipole arm and a ground conductor that is electrically connected to an input of the first switch.

13. The access point of claim 12, wherein the feed network further includes a second switch that is configured to selectively electrically connect the first output of the first switch to the first dipole arm.

14. An access point, comprising:

a ground plane;

a dipole radiating element that includes a first dipole arm and a second dipole arm;

a first switch having an input, a first output that is electrically connected to the second dipole arm, and a second output that is electrically connected to the ground plane;

a first RF transmission line that includes a signal conductor that is electrically connected to the first dipole arm and a ground conductor that is electrically connected to an input of the first switch; and a second switch that is configured to selectively electrically connect the first output of the first switch to the first dipole arm.

15. The access point of claim 14, further comprising a plurality of additional dipole radiating elements, the dipole radiating element and the plurality of additional dipole radiating elements configured as an Alford Loop, each of the plurality of additional dipole radiating elements comprising a first dipole arm and a second dipole arm, wherein the feed network further comprises a power divider having an input that is coupled to the signal conductor and a plurality of outputs that electrically connect the signal conductor to the respective first dipole arms of the dipole radiating element and the plurality of additional dipole radiating elements in the Alford Loop.

16. The access point of claim 15, further comprising:

a plurality of additional first switches, each additional first switch having an input that is electrically connected to the ground conductor, a first output that is electrically connected to the second dipole arm of a respective one of the plurality of additional dipole radiating elements, and a second output that is electrically connected to the ground plane; and a plurality of additional second switches that are configured to selectively electrically connect the first output of a respective one of the plurality of additional first switches to the first dipole arm of a respective one of the plurality of additional dipole radiating elements.

17. The access point of claim 14, further comprising:

a first parasitic pattern shaping element that is configured to shape first radiation patterns emitted by the dipole radiating element that have a horizontal polarization with respect to the ground plane; and a second parasitic pattern shaping element that is configured to shape second radiation patterns emitted by the dipole radiating element that have a vertical polarization with respect to the ground plane.

18. The access point of claim 14, wherein the access point is configured to set the first and second switches so that the dipole radiating element will emit RF energy having a first polarization when transmitting to a first client device and to set the first and second switches so that the dipole radiating element will emit RF energy having a different second polarization when transmitting to a second client device.

* * * * *